United States Patent [19]
Yokoi

[11] Patent Number: 5,209,961
[45] Date of Patent: May 11, 1993

[54] TOOTHED BELT

[75] Inventor: Junji Yokoi, Nara, Japan

[73] Assignee: Unitta Co., Ltd., Osaka, Japan

[21] Appl. No.: 714,391

[22] Filed: Jun. 12, 1991

[30] Foreign Application Priority Data

Jun. 13, 1990 [JP] Japan .................. 2-156520

[51] Int. Cl.$^5$ .................. B32B 3/00; F16G 1/00
[52] U.S. Cl. .................. 428/161; 428/68;
428/113; 428/156; 428/167; 428/172; 428/213;
428/245; 428/288; 428/290; 428/365; 428/371;
428/401; 474/205; 474/249; 474/250; 474/260;
474/263; 474/266; 74/10.7; 74/37; 74/82;
74/665 GE
[58] Field of Search .......... 428/156, 161, 167, 162,
428/163, 172, 68, 109, 113, 120, 141, 212, 213,
228, 232, 245, 288, 289, 290, 332, 365, 371, 401;
156/137–141; 474/205, 249, 250, 260, 269, 266;
427/176; 74/10.29, 10.7, 37, 82, 665 GE

[56] References Cited

U.S. PATENT DOCUMENTS 4,266,937 5/1981 Takano .................. 156/141

FOREIGN PATENT DOCUMENTS

| 0229949 | 7/1987 | European Pat. Off. . |
| 0271587 | 6/1988 | European Pat. Off. . |
| 60-172749 | 9/1985 | Japan . |
| 62-159827 | 7/1987 | Japan . |
| 64-87937 | 4/1989 | Japan . |
| 1-213478 | 8/1989 | Japan . |
| 1-269743 | 10/1989 | Japan . |

Primary Examiner—Donald J. Loney
Attorney, Agent, or Firm—Nikaido, Marmelstein, Murray & Oram

[57] ABSTRACT

A toothed belt of the present invention comprises a back surface section and tooth sections that are made of an acrylonitrile-butadiene copolymer (NBR) with a hydrogenation rate of 90% or more; a tooth cloth that covers the surface of the tooth sections and tooth lands, the tooth cloth being made of an industrial nylon raw fiber with a viscosity relative to sulfuric acid of 2.45 to 2.53, a tensile strength of 5 g/denier or more, and a fineness of single fibers of 5 denier or less and being treated with resorcinol-formaldehyde-latex (RFL) liquid in which resorcinol-formaldehyde resin is mixed with a hydrogenated NBR as a latex component; and core fibers with a core diameter of 0.63 to 0.85 mm, the core fibers being made of twisted bundles of glass fibers of high strength.

6 Claims, 2 Drawing Sheets

TOOTHED BELT

BACKGROUND OF THE INVENTION

1. Field of the Invention

The present invention relates to a toothed belt, for example, for driving the overhead cam (OHC) shaft of an automobile, and more particularly it relates to a toothed belt having great durability that makes possible a long life-span under severe operating conditions.

2. Description of the Prior Art

Unlike flat belts, V-shaped belts or the like, toothed belts do not slip, and thus have high transmission efficiency. In addition, compared with transmission apparatus such as gears, chains, etc., the toothed belts have the advantage of very little noise. Thus, toothed belts are used for simultaneous drive in such places as automotive overhead cam (OHC) shafts, and their use is increasing.

Conventionally, a toothed belt is constructed, as shown in FIG. 1, by a back surface section 1 and tooth sections 2, both of which are formed from an elastic substance such as rubber, a tooth cloth 3 which covers the surface of the tooth sections 2 and the tooth lands 5 positioned between the adjacent tooth sections 2 to prevent abrasion arising from friction between the belt and the pulleys, and a plurality of core fibers 4, 4, . . . passing through the inside of the back surface section 1 in the longitudinal direction so as to touch the tooth cloth 3.

A toothed belt with such a structure is used, for example, for a simultaneous drive of an OHC shaft of an automobile. The toothed belt for the driving of an OHC shaft moves at high speeds under a heavy load and at high temperatures. In particular, recently, high output automobile engines are being developed, where the toothed belt moves at higher speeds and the engine temperature becomes higher. When the toothed belt is used under such conditions, the abrasion of the tooth cloth which covers the bottom section of the belt is accelerated by being in contact with pulleys, and at the same time, the tooth cloth is deteriorated by being exposed to high temperatures. When the toothed belt is wound over a large number of pulleys, the toothed belt moves with many bends. Because the toothed belt for driving an OHC shaft is used at high temperatures, the elastic substance such as rubber, etc., that is used for the construction of the back surface section 1 and the tooth sections 2 undergoes aging, which gives rise to severe cracking. Because of movement at high speeds under a heavy load, the abrasion of the tooth cloth 3 which touches the pulleys is great, which easily gives rise to cracking, shear, etc. Similarly, a high pressure is applied to the tooth sections 2 engaged with the pulleys, which easily gives rise to cracking, shear, etc., resulting in damage. Moreover, when the toothed belt moves with a number of bends, being wound by many pulleys, the bending sections of the toothed belt increase, so that internal heat is generated by friction between the core fibers 4 and the elastic substance forming both the back surface section 1 and the tooth sections 2, which causes accelerated aging of the core fibers and elastic substance. As described above, the toothed belt for driving an OHC shaft is used under severe conditions, so it has a problem of durability and cannot be operated for a long period of time.

A toothed belt with excellent durability is proposed in Japanese Laid-Open Patent Publication Nos. 62-159827 and 64-87937. The toothed belt disclosed in Japanese Laid-Open Patent Publication No. 62-159827 uses a hydrogenated acrylonitrile-butadiene copolymer (NBR) with a hydrogenation rate of 80% or more as the back surface section 1 and the tooth sections 2, an industrial nylon raw fiber for the tooth clothing 3, having a viscosity relative to sulfuric acid of 2.6 to 2.8, a tensile strength of 5 g/denier or more, and a fineness of single fibers of 5 denier or less as the tooth cloth 3, and moreover, the core fibers 4 are made of twisted bundles of glass fiber filaments with a predetermined twist number, the core diameter with respect to the tooth cloth being in a predetermined range. The structure as described above makes possible remarkably improved durability as well as the stable movement for a long period of time at high speeds under a heavy load.

However, there is a problem such that when such a toothed belt is used for driving an OHC shaft of an automobile, sufficient durability cannot be obtained because of the severe conditions, and the life-span is shorter compared with that of the engine. In particular, recently, higher output of automobile engines are being attempted, so that the toothed belt moves at higher speeds and the engine temperature becomes higher. When the toothed belt is used under these conditions, the abrasion kf the tooth cloth which covers the bottom section of the belt is accelerated by being in contact with the pulleys, and at the same time, the deterioration of the tooth cloth is accelerated by being exposed to high temperatures. When the belt moves, the applied force concentrates at a root section of a tooth and the root section is readily bent, so that the movement of the belt under such conditions gives rise to cracking of the tooth cloth at the root section, and moreover, the tooth section of the belt suffers a loss.

As described above, the toothed belt used in an engine room moves at high temperatures and high speeds, resulting in the damage of the belt due to the deterioration of the tooth cloth.

Also, the inside of the engine room is sealed with a cover, but the seal property is not sufficient. Therefore, water, sand, mud, or dust, etc., (hereinafter, referred to as environmental foreign matter) invade the engine room, and there is the possibility that they may cover the belt together with engine oil or the like in the engine room. When such environmental foreign matter invades between the tooth cloth 3 at the tooth lands 5 and pulleys, the abrasion of the tooth cloth 3 is accelerated. Such an abrasion of the tooth cloth 3 is accelerated faster than that of the tooth cloth 3 occurring under the severe conditions described above, so that there is the possibility that cracking is generated in the tooth cloth 3 of the root section. The abrasion of the tooth cloth 3 is accelerated to cause damage to the core fibers 4 which are in direct contact with the tooth cloth 3 in the early stages. Such conditions result in a loss of the tooth sections 2, a break of the core fibers 4, etc. Since the damage of the belt caused by such environmental foreign matter occurs earlier than that occurring under severe conditions such as high temperatures, it is conceivable that the elements such as thermal fatigue and bending fatigue may have some effects on the damage rate of the belt.

As described above, in the toothed belt for an automobile engine, in order to improve the life-span of the belt, it is important to prevent the damage of the belt caused by the environmental foreign matter. For this reason, it is necessary to improve heat-resistance, resistance to bending, resistance to abrasion, strength, and adhesive property between the core fibers and the back surface section.

In view of the back surface section 1 and the tooth sections 2, since yet a higher output of an automobile engine is further expected, these portions are further exposed to high temperatures. Because of this, the rubber material forming the back surface section and the tooth section is required to have stronger heat-resistance.

It is usually preferred that the diameter of the core fibers 4 may be small in order to suppress the heat generation due to the friction with the rubber material forming the back surface section 1 and the tooth sections 2, the heat generation due to the friction with the tooth cloth 3, and moreover the internal heat generation in the core fibers 4 themselves (heat of friction between each fiber forming the core fibers). However, when the diameter of the toothed belt is made small, the strength of the core fibers 4 themselves is lowered and sufficient tensile strength cannot be obtained. Because of that, it is necessary to use core fibers 4 with a small fineness but with sufficient tensile strength.

The tooth cloth 3 is in direct contact with pulleys and is subject to environmental effects such as those caused by the environmental foreign matter, so that various mechanical characteristics of the tooth cloth 3 have a great effect on the entire characteristics of the toothed belt. Accordingly, if the tooth cloth 3 is not composed of good materials, a good balance of various mechanical characteristics which are necessary for a toothed belt having excellent resistance to the environment cannot be obtained.

Also, when considering the engagement of the tooth cloth 3 with the pulleys, there is a problem that the thickness of the tooth cloth 3 is limited by the diameter of the core fibers 4. In order to obtain an appropriate engagement with the pulleys, the thickness of the tooth cloth 3 and the diameter of the core fibers 4 at the tooth lands must be within a predetermined range. Accordingly, when the thickness of the tooth cloth 3 becomes large, the mechanical strength of the tooth cloth 3 itself improves. However, in view of the engagement with the pulleys, the diameter of the core fibers 4 must be made small. In order to enlarge the thickness of the tooth cloth 3, the diameter of the core fibers 4 must be made small. The bending rigidity of the belt itself is lowered by making the diameter of the core fibers 4 small, so that the bending fatigue property of the tooth cloth 3 at the root section can be reduced. When the diameter of the core fibers 4 is made small, at the tooth lands, the area of contact between the core fibers 4 and the rubber material forming the back surface section 1 and the tooth sections 2, and the area of contact between the core fibers 4 and the tooth cloth 3 become small. On the other hand, the area of contact between the rubber material and the tooth cloth 3, which are in contact with each other between each core fiber 4, increases.

In particular, when the core fibers 4 are made of glass fiber, the elasticity of glass fiber is very low compared with rubber material, so the shock which is generated when the belts are engaged with the pulleys cannot be absorbed by the glass core fibers themselves. However, as described above, when the area of contact between the rubber material and the tooth cloth 3 is increased, the shock with the pulleys is absorbed by the rubber material and the shock applied to the core fibers 4 is alleviated. In the same way, the shock applied to the tooth cloth 3, which is generated by the engagement with the pulleys, is absorbed by the rubber material which is in contact with the tooth cloth 3, so that the durability of the tooth cloth 3 itself improves. When environmental foreign matter intervenes between the tooth cloth 3 and the pulleys, the shock applied to the tooth cloth 3, core fibers 4, and rubber material is further increased. However, the area of contact between the tooth cloth 3 and the rubber material is increased, so that the shock is absorbed by the rubber material and the durability of the tooth cloth 3 and the core fibers 4 is further improve compared with the prior art.

SUMMARY OF THE INVENTION

The inventors have found from their experimental results that when an elastic substance for the back surface section 1 and the tooth sections 2, the tooth cloth 3 which covers the tooth sections 2 and the tooth lands 5, and the core fibers 4 are formed by the combination of predetermined materials, the durability of the toothed belt itself can be remarkably improved.

The toothed belt of this invention, which overcomes the above-discussed and numerous other disadvantages and deficiencies of the prior art, comprises:
a back surface section and tooth sections that are made of an acrylonitrile-butadiene copolymer (NBR) with a hydrogenation rate of 90% or more,
a tooth cloth that covers the surface of the tooth sections and tooth lands, the tooth cloth being made of an industrial nylon raw fiber with a viscosity relative to sulfuric acid of 2.45 to 2.53, a tensile strength of 5 g/denier or more, and a fineness of single fibers of 5 denier or less and being treated with resorcinol-formaldehyde-latex (RFL) liquid in which resorcinol-formaldehyde resin is mixed with a hydrogenated NBR as a latex component, and
core fibers with a core diameter of 0.63 to 0.85 mm, the core fibers being made of twisted bundles of glass fibers with high strength.

In a preferred embodiment, the toothed belt is used for driving an overhead cam shaft of an automobile.

In a preferred embodiment, the back surface section and tooth sections are made of hydrogenated NBR, vulcanized with peroxide.

Thus, the invention described herein makes possible the objective of providing a toothed belt with remarkably improved durability, in particular, which has excellent durability with respect to environmental foreign matter and can operate stably for a long period of time even at high speeds under a heavy load.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Hereinafter, this invention will be described by way of examples.

Figure 1:
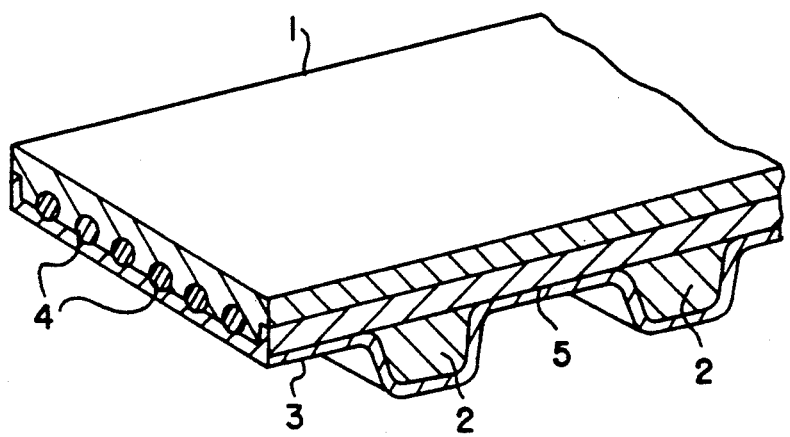
FIG. 1 is a fragmentary sectional view showing a toothed belt.

The toothed belt of this invention, which has the same external appearance as that of the conventional toothed belt shown in FIG. 1, comprises a back surface section 1, tooth sections 2, a tooth cloth 3 covering the surface of the tooth sections 2 and tooth lands 5, and a plurality of core fibers 4, 4 . . . passing through the inside of the back surface section 1. Each core fiber 4 is also in contact with the tooth cloth 3.

The back surface section 1 and the tooth sections 2 are formed from, for example, an acrylonitrile-butandiene copolymer (NBR) with a hydrogenation rate of 90% or more, vulcanized with peroxide. With NBR of a hydrogenation rate of 90% or more, the heat resistance and ozone resistance, etc. are improved, and moreover the resistance to thermosetting, internal generation of heat, cold, and oil is superior. Furthermore, with this NBR, the adhesive property with the tooth cloth 3 and each core fiber 4 is excellent, so that the NBR is preferable as an elastic substance forming the back surface section 1 and the tooth sections 2 of the toothed belt The NBR forming the back surface section 1 and the tooth sections 2 is not limited to those vulcanized with peroxide, but may be vulcanized with sulfur. NBR which is vulcanized with peroxide, has the following characteristics compared with the NBR, which is vulcanized with sulfur. With the NBR vulcanized with peroxide, the tensile strength is better than that of the NBR vulcanized with sulfur. Also, the stretch is low and the modulus is high. The permanent stretch is small, the resistance to tear is high, and the dynamic generation of heat and low-temperature bending property are satisfactory. The compressive permanent strain is small, particularly, in high-temperature air or heated oil. The resistance to heat-aging is particularly excellent and also the resistance to aging in the vapor or heated oil are excellent. Because it has such characteristics, the hydrogenated NBR vulcanized with peroxide is preferable when it is used for driving the OHC shaft of an automobile.

A cloth composed of an industrial nylon raw fiber is used for the tooth cloth 3. The industrial nylon raw fiber has a viscosity relative to sulfuric acid of 2.45 to 2.53. The viscosity relative to sulfuric acid is higher, which means that the polymerization degree of nylon resin which is a raw material for the cloth is also higher, and even though the cloth manufactured by the use of the resin has improved strength, the bending fatigue property is lowered. Therefore, a viscosity relative to sulfuric acid of 2.45 to 2.53 is the most preferable.

The tensile strength of the industrial nylon raw fiber which is used is 5 g/denier or more, and the fineness of the single fiber is 5 denier or less. The cloth which is manufactured by the use of such an industrial nylon raw fiber has excellent tensile strength, heat resistance, and resistance to abrasion. Then such a cloth is treated (RFL treatment) with resorcinol formaldehyde latex (RFL) liquid in which resorcinol formaldehyde resin is mixed with the hydrogenated NBR as a latex component to form the tooth cloth. The tooth cloth which is RFL-treated has an excellent adhesive property with a hydrogenated NBR, so that the tooth cloth satisfactorily adheres to the back surface section and the tooth sections formed from the hydrogenated NBR and cracking which is generated at the root section of the tooth cloth 3 due to the bending while in motion can be suppressed.

Each core fiber 4 can be obtained by first-twisting and then second-twisting a glass fiber with high strength. The glass fiber with high strength, compared with E glass fiber, has an increased content ratio of $SiO_2$, $Al_2O_3$, and $MgO$ components, respectively and the content ratio of $CaO$ and $B_2O_3$ components are decreased, respectively. The ratio of the content components of the high strength glass fiber with respect to the E glass fiber is shown in Table 1.

TABLE 1

| Item of component | Glass with high strength | E glass |
| --- | --- | --- |
| $SiO_2$ (%) | 60–65 | 52–56 |
| $Al_2O_3$ (%) | 23–26 | 12–16 |
| $CaO$ (%) | 0–10 | 12–25 |
| $MgO$ (%) | 7–11 | 0–6 |
| $B_2O_3$ (%) | 0–1 | 8–13 |

Examples for such glass fibers with high strength are S glass fiber, R glass fiber, and T glass fiber, etc. In this way, the tensile strength of the core fibers 4 themselves is improved by using glass fiber with high strength as core fibers 4.

The diameter of each core fiber 4 is 0.63 to 0.85 mm, preferably 0.65 to 0.80 mm when the core fibers 4 are in contact with the hydrogenated NBR forming the back surface section 1 and the tooth sections 2 (when in a toothed belt). In this way, the internal heat generation due to the abrasion generated during bending can be suppressed by making the diameter of the core fibers 4 small.

Moreover, if the ratio of the diameter of the core fibers 4 to the thickness of the tooth cloth 3 is established in a predetermined range, when the core fibers 4 are in contact with the back surface section 1 and the tooth sections 2 made of the hydrogenated NBR and the tooth cloth made of the industrial nylon raw fiber, premature fatigue of the core fibers 4 from bending, loss of teeth (loss of the tooth sections 2), and jumping during movement can be prevented. That is, when the ratio of the diameter of the core fibers 4 to the thickness of the tooth cloth 3 in a finished toothed belt is 1.5 or less, jumping during movement readily arises. On the other hand, when the ratio is 2.2 or more, the durability of the teeth is rapidly decreased, accompanying a decrease in the prevention of jumping. Therefore, setting the ratio of the diameter of the core fibers 4 to the thickness of the tooth cloth 3 in the range of 1.5 to 2.2 prevents such problems as premature fatigue of the core fibers 4 from bending, loss of teeth, and jumping during movement.

It is preferable that each core fiber 4 is RFL-treated in the same manner as described above. The core fibers 4 which are RFL-treated satisfactorily adhere to the hydrogenated NBR and the tooth cloth which is RFL-treated.

EXAMPLE

An industrial nylon raw fiber with a fineness of 5 denier, a strength of 5 g/denier, and a viscosity relative to sulfur acid of 2.45, was used to produce a cloth, and then the cloth was RFL-treated to obtain a tooth cloth. Also, core fibers with a diameter of 0.63 mm (at tooth lands) was formed from high strength glass fibers. A toothed belt was produced by the use of such tooth cloth, core fibers, and NBR with a hydrogenation rate of 90%. A toothed belt was manufactured by placing a tooth cloth, core fibers, and unvulcanized hydrogenated NBR in this order into a mold, and then vulcanized with peroxide. The width of the toothed belt was 19 mm, the number of the teeth was 92, and the tooth shape was ZB (under the JASO standard, E105-81 (an automobile belt) and E106-81 (pulley)).

In the toothed belt produced in this way, the tooth cloth at the root section was subject to the bending fatigue test, water resisting property test, root strength test, core fiber bending fatigue test, and environmental resistance test, respectively.

Figure 2:
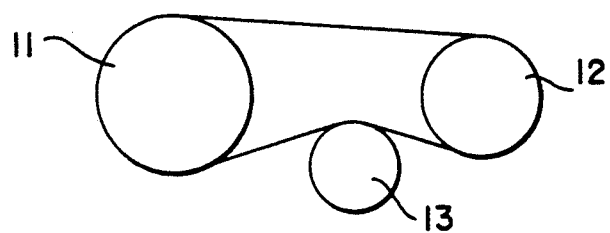
FIG. 2 is an explanatory view showing a 2-axial drive test.

The bending fatigue test of the tooth cloth at the root section was performed by a 2-axial drive test as shown in FIG. 2. In the 2-axial drive test, the driving toothed pulley 12 was 20 ZB (JASO, E105-81, E106-81), and a driven toothed pulley 11 was 40 ZB. The driving toothed pulley 12 was rotated at 6000 rpm. A tension pulley 13 was adjusted so that the initial tension of the toothed belt (the width thereof being 19 mm) was set at 15 kg.f, and the toothed belt was driven at the 10 horsepower. The ambient temperature in this case was set at 110° C. The time taken until the tooth cloth at the root section of the toothed belt was damaged was measured to be from 4000 to 4320 hours. The results are shown in Table 2.

The water resisting property test was performed by a 2-axial drive test in the same manner as that shown in FIG. 2. In this case, the driving atmosphere was filled with vapor at 100° C. The water resisting property was evaluated by the decrease of the thickness of the tooth cloth at the tooth lands of the belt. The decrease in the thickness of the tooth cloth after 2000 hours driving was 0.06 mm. The results are shown in Table 2.

Figure 3:
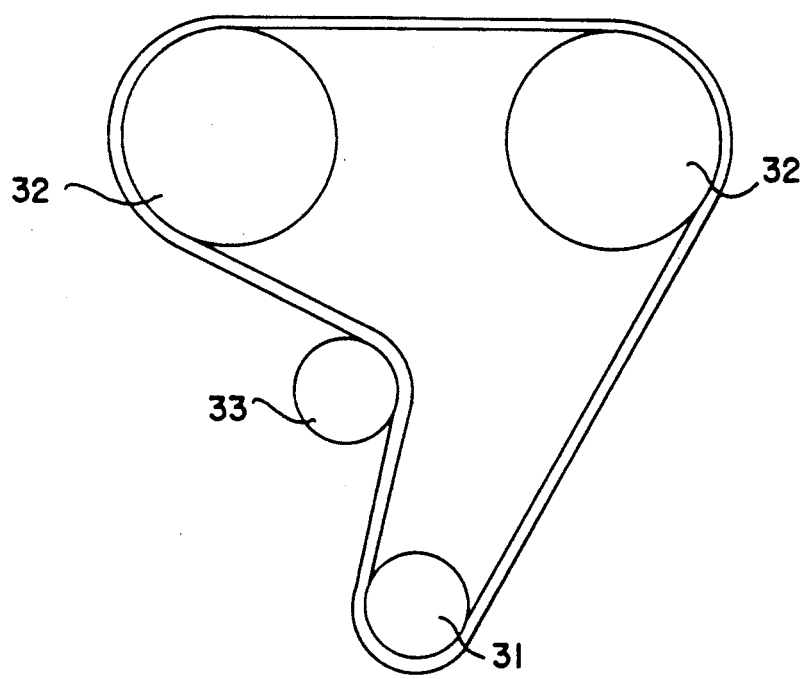
FIG. 3 is an explanatory view showing a 3-axial drive test.

The root strength test was performed by a 3-axial test as shown in FIG. 3. In the 3-axial test, a driving pulley 31 with 20 teeth and each driven pulley 32 with 40 teeth were used. A tension pulley 33 was adjusted so that 5 kg.f of tension was applied to the toothed belt. The driving pulley 31 was driven at 2600 rpm, and the time taken until the root of the tooth section was damaged by shear was measured to be 584 hours. The results are shown in Table 2.

Figure 4:
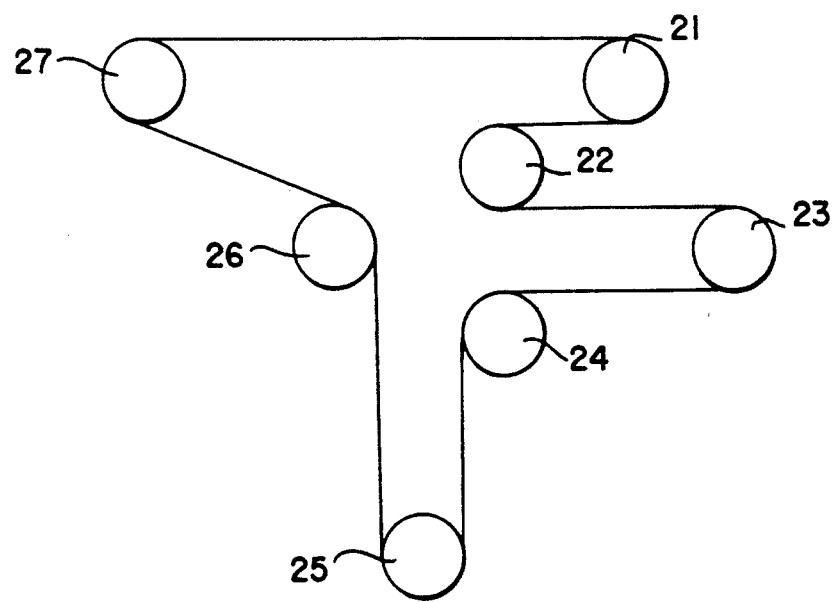
FIG. 4 is an explanatory view showing a poly-bending drive test.

The bending fatigue test of the core fibers was performed by a 7-axial test shown in FIG. 4. Each pulley 21, 23, 25, and 27, which were wound by the toothed belt, were 14 ZA, and the other pulleys 22, 24, and 26 were flat pulleys with a diameter of 52 mm. The initial tension of the toothed belt (the width thereof being 19 mm) was 13 kg.f. A predetermined pulley 25 was rotated at room temperature at 4500 rpm without any toothed belt was damaged under these operational conditions was measured to be 4500 hours. The results are shown in Table 2.

In the environmental resistance test, the test machine shown in FIG. 3 was used, and the belt was driven by pouring a predetermined amount of water which contains a predetermined amount of mud once a day in an atmosphere filled with vapor at 100° C. The time taken until the tooth cloth was remarkably abraded and damaged at the tooth lands, and then the core fibers were exposed to cut the belt was measured to be 450 hours. The results are shown in Table 2.

COMPARATIVE EXAMPLE 1

A cloth made of an industrial nylon raw fiber with a fineness of 5 denier, a strength of 5 g/denier, and a viscosity relative to sulfuric acid of 2.60 was used as a tooth cloth. The tooth cloth was not RFL-treated, but was treated with the same composition as that of rubber forming the back surface section and the tooth section. Also, a core fiber with a diameter of 1.05 mm was produced by using a glass fiber with high strength. A toothed belt was manufactured by using the tooth cloth, the core fibers and an NBR with a hydrogenation rate of 80%. The toothed belt was manufactured by placing the tooth cloth, core fibers, and unvulcanized hydrogenated NBR in this order into a mold, then vulcanized with sulfur. In the toothed belt produced in this manner, the tooth cloth at the root section was subject to the bending fatigue test, water resisting property test, root strength test, core fiber bending fatigue test, and environmental resistance test in the same manner as that of the above-mentioned example, respectively. The results are shown in Table 2.

COMPARATIVE EXAMPLE 2

This is the same as Comparative example 1 except that the diameter of the core fibers is 0.63 mm. The results are shown in Table 2.

COMPARATIVE EXAMPLE 3

This is the same as Example except that the diameter of the core fibers is 1.05 mm. The results ar shown in Table 2.

COMPARATIVE EXAMPLE 4

This is the same as Comparative example 2 except that the treatment agent of the tooth cloth, in which the latex component was vinyl pyridine-styrene-butadiene latex, was used. The results are shown in Table 2.

COMPARATIVE EXAMPLE 5

This is the same as Comparative example 4 except that the treatment agent of the tooth cloth, in which the latex component was chlorosulfonated polyethylene latex, was used. The results are shown in Table 2.

COMPARATIVE EXAMPLE 6

This is the same as Comparative example 4 except that the treatment agent of the tooth cloth, in which the latex component was carboxylated NBR latex, was used. The results are shown in Table 2.

TABLE 2

|  | Tooth cloth fatigue hrs | Water resisting property mm | Root strength hrs | Core fiber fatigue hrs | Environmental resistance hrs |
| --- | --- | --- | --- | --- | --- |
| Example | 4000–4320 | 0.06 | 584 | 4500 | 450 |
| Comparative Example 1 | 2500–2700 | 0.11 | 365 | 3000 | 170 |
| Comparative Example 2 | 2800–3000 | 0.10 | 400 | 3600 | 225 |
| Comparative Example 3 | 3100–3300 | 0.09 | 450 | 3300 | 263 |
| Comparative Example 4 | 1900–2200 | 0.18 | 250 | 2500 | 65 |
| Comparative Example 5 | 2700–2900 | 0.14 | 330 | 3450 | 100 |
| Comparative Example 6 | 2800–3000 | 0.12 | 350 | 3600 | 150 |

The toothed belt of this invention is remarkably improved in the resistance to bending fatigue of the tooth cloth, water resisting property, root strength, and resistance to bending fatigue of the core fibers compared with conventional toothed belts. Moreover, the toothed belt of this invention has almost twice the durability against environmental foreign matter compared with the comparative examples. Even though the diameter of the core fibers are the same as that of the belts of this invention, if the tooth cloth is not RFL-treated, the same effects as those of the belt of this invention cannot be obtained in the various characteristics. In the same way, even though the tooth cloth is RFL-treated, if the diameter of the core fibers are not the same as that of the belt of this invention, the same effects as those of the belt of this invention cannot be obtained.

In the toothed belt of this invention, as described above, the back surface section and the tooth section are formed from NBR with a hydrogenation rate of 90% or more, the tooth cloth is made of an industrial nylon raw fiber and is treated with an RFL in which the latex component is hydrogenated NBR, and moreover the core fibers with small fineness using a glass fiber with high strength is used, so that the NBR, tooth cloth, and core fibers are in strong contact with each other, and the root strength, water resisting property, and resistance to bending fatigue are remarkably improved. Accordingly, the toothed belt of this invention can stably operate for a long period of time even under severe conditions such as at high temperatures under a heavy load and at high speeds and can be preferably used for driving the OHC shaft of an automobile.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the present invention, including all features that would be treated as equivalents thereof by those skilled in the art to which this invention pertains.

What is claimed is:

1. A tooth belt comprising:
   a back surface section;
   a plurality of teeth spaced apart and disposed on one side of said back surface section, whereby a tooth land is formed between two adjacent teeth, wherein said back surface section and each of said teeth are made of an acrylonitrile-butadiene copolymer (NBR) having a hydrogenation rate of 90% or more;
   core fibers contacting and interposed between said back surface section and said plurality of teeth, the core fibers having a core diameter of 0.63 to 0.85 mm and comprising twisted bundles of glass fibers; and
   a tooth cloth covering the surface of each of said teeth and each of said tooth lands, said tooth cloth being made of an industrial nylon raw fiber with a viscosity relative to sulfuric acid of 2.45 to 2.53, a tensile strength of 5 g/denier or more, and a fineness of single fibers of 5 denier or less, said tooth cloth being treated with resorcinol-formaldehyde-latex (RFL) liquid in which a resorcinol-formaldehyde resin is mixed with a hydrogenated NBR as a latex component.

2. A toothed belt according to claim 1, which is used for driving an overhead cam shaft of an automobile.

3. A toothed belt according to claim 2, wherein said back surface section and tooth sections are made of hydrogenated NBR, vulcanized with peroxide.

4. A tooth belt according to claim 1, wherein said glass fibers have substantially the following composition in percent by weight:

| | |
|---|---|
| $SiO_2$ | 60–65% |
| $Al_2O_3$ | 23–26% |
| CaO | 0–10% |
| MgO | 7–11% |
| $B_2O_3$ | 0–1% |

5. A toothed belt according to claim 1, wherein the ratio of the diameter of the glass fibers to the thickness of the tooth cloth is about 1.5 to 2.2.

6. A tooth belt according to claim 1, wherein said glass fibers have a diameter of about 0.65 to 0.80 mm.

* * * * *

UNITED STATES PATENT AND TRADEMARK OFFICE
CERTIFICATE OF CORRECTION

PATENT NO. : 5,209,961
DATED : May 11, 1993
INVENTOR(S) : Junji YOKOI

It is certified that error appears in the above-indentified patent and that said Letters Patent is hereby corrected as shown below:

Column 10, line 1, change "tooth" to -- toothed --.
Column 10, line 29, change "tooth" to -- toothed --.
Column 10, line 42, change "tooth" to -- toothed --.

Signed and Sealed this

Twenty-fifth Day of January, 1994

Attest:

BRUCE LEHMAN

*Attesting Officer*     *Commissioner of Patents and Trademarks*